United States Patent
Tippmann, Sr.

(10) Patent No.: US 6,851,772 B2
(45) Date of Patent: Feb. 8, 2005

(54) CLOSURE FOR SELECTIVELY CLOSING A CONTAINER

(75) Inventor: Vincent P. Tippmann, Sr., Fort Wayne, IN (US)

(73) Assignee: Universal Lid Corporation, Fort Wayne, IN (US)

( * ) Notice: Subject to any disclaimer, the term of this patent is extended or adjusted under 35 U.S.C. 154(b) by 196 days.

(21) Appl. No.: 10/214,718

(22) Filed: Aug. 9, 2002

(65) Prior Publication Data

US 2003/0061943 A1 Apr. 3, 2003

Related U.S. Application Data

(60) Provisional application No. 60/311,094, filed on Aug. 10, 2001.

(51) Int. Cl.[7] ............................................... A47B 97/00

(52) U.S. Cl. ........................................ 312/301; 312/291

(58) Field of Search ................................ 312/291, 301, 312/404, 408, 410; 108/107, 110; 219/385, 428; 99/467, 483

(56) References Cited

U.S. PATENT DOCUMENTS

| | | | | | |
|---|---|---|---|---|---|
| 539,662 | A | * | 5/1895 | Beckwith | 108/107 |
| 1,937,935 | A | * | 12/1933 | Zimmerman | 108/110 |
| 3,169,813 | A | * | 2/1965 | Cannon et al. | 312/270.3 |
| 4,804,824 | A | * | 2/1989 | Saguchi | 235/7 R |
| 4,836,391 | A | * | 6/1989 | Bell | 211/60.1 |
| 5,405,194 | A | * | 4/1995 | Binder | 312/205 |
| 5,443,311 | A | * | 8/1995 | Kadlecek et al. | 312/308 |
| 5,900,173 | A | * | 5/1999 | Robards, Jr. | 219/392 |
| 6,262,394 | B1 | * | 7/2001 | Shei et al. | 219/399 |
| 6,412,403 | B1 | * | 7/2002 | Veltrop | 99/483 |

* cited by examiner

Primary Examiner—Janet M. Wilkens
(74) Attorney, Agent, or Firm—Birch, Stewart, Kolasch & Birch, LLP

(57) ABSTRACT

A closure for a container includes a first surface having a front end, a rear end, a first side and a second side. A first sidewall extends a predetermined distance from said first side of said first surface. A second sidewall extends a predetermined distance from said second side of said first surface. At least one notch is formed in said first sidewall for engaging a shelf for selectively mounting the closure on the shelf during non-use of a container and for closing an opening in a top of a container when the container is positioned on the shelf.

18 Claims, 9 Drawing Sheets

US 6,851,772 B2

CLOSURE FOR SELECTIVELY CLOSING A CONTAINER

CROSS-REFERENCE TO RELATED APPLICATIONS

The present application claims priority under 35 USC 120 to Provisional Patent Application No. 60/311,094, filed on Aug. 10, 2001 the entire contents thereof is hereby incorporated by reference.

BACKGROUND OF THE INVENTION

1. Field of the Invention

The present invention relates to a lid for use with a container that is typically used in the foodservice and restaurant industry 2. Description of Background Art Heretofore, container that are used in the foodservice and restaurant industry required a metal or plastic pan lid that is positioned on top of the container during the storage of a food product. The metal or plastic lids have to be constructed to be of a predetermined size to fit a particular container. In addition, the metal or plastic lids have to be stored during non-use of the lids.

Other techniques for closing the top of a container consisted of using plastic wrap or aluminum. This requires the use of labor for handling the container to secure the plastic wrap or aluminum thereto. In addition, depending on the temperature of the food, the use of plastic wrap may not be suitable. Further, it is difficult to handle a hot container making the use of plastic wrap or aluminum difficult. Further, it is required to always have available both aluminum and plastic wrap to ensure that an employee will be able to use the proper material to close the top to the container.

SUMMARY AND OBJECTS OF THE INVENTION

It is an object of the present invention to provide a closure for a container that is normally stored within a shelf, oven or refrigerator and is selectively positioned on a container when a container is slid onto the shelf, into the oven or refrigerator for closing the container during use.

Another object of the present invention to provide a closure for a container that is capable of closing a variety of sizes of containers as the containers are slid onto the shelf, into the oven or refrigerator for closing the container during use.

A still further object of the present invention is to reduce labor cost, supplies and increase the speed of operation.

Another object of the present invention is to provide a better seal for a container.

A further object of the present invention is to eliminate the use of metal or plastic lids, plastic wrap and aluminum during the cooking, storing, holding and refrigerating of food in a foodservice or restaurant industry.

These and other objects of the invention are achieved by providing a closure for a container including a first surface including a front end, a rear end, a first side and a second side. A first sidewall is provided that extends a predetermined distance from said first side of said first surface. A second sidewall is provided that extends a predetermined distance from said second side of said first surface. At least one notch is formed in said first sidewall adapted for engaging a shelf for selectively mounting said closure on said shelf during non-use of a container and for closing an opening in a top of a container when said container is positioned on said shelf.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
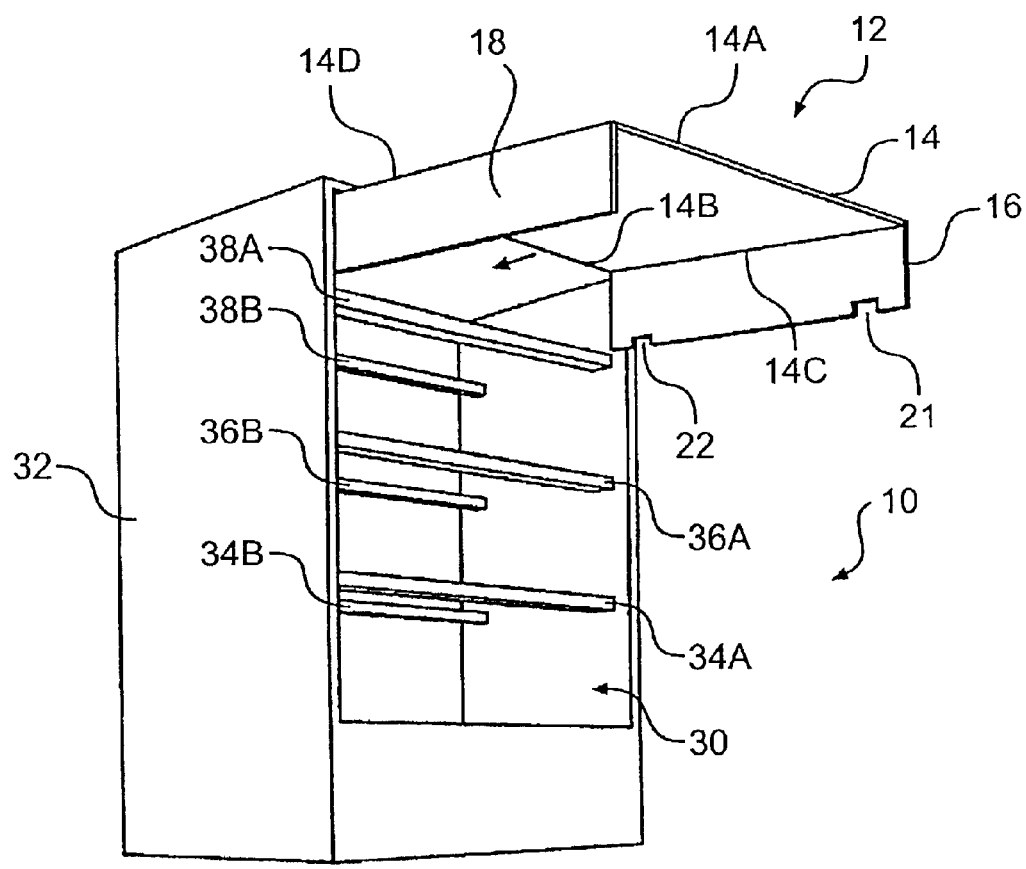
FIG. 1 is a perspective view of a shelf unit wherein a closure lid is being moved into the shelf unit for engagement with the shelf.

As illustrated in FIGS. 1-5, a cabinet 10, such as a shelf unit, or an oven or a refrigerator, is provided with a plurality of shelf supports 34A, 34B, 36A, 36B, 38A and 38B disposed within the cabinet 10. The cabinet 10 includes a housing 32 that forms an opening 30 for providing access to the plurality of shelf supports 34A, 34B, 36A, 36B, 38A and 38B. A door for closing the opening 30 may be provided depending on the type and use of the cabinet 10.

A closure 12 includes a first surface 14 having a front end 14A, a rear end 14B, a first side 14C and a second side 14D. A first sidewall 16 extends downwardly a predetermined distance from said first side 14C of said first surface 14. A second sidewall 18 extends downwardly a predetermined distance from said second side 14D of said first surface 14. At least one notch, 21, 22, is formed in said first sidewall 16. As illustrated in FIGS. 1–5, two notches 21, 22 may be provided that are adapted for engaging the shelf supports 38A, 38B disposed within the cabinet 10 for selectively mounting the closure 12 on the shelf supports 38A, 38B during non-use of a container 40 and for closing an opening in a top of a container 40 when the container 40 is positioned on the shelf supports 38A, 38B.

Figure 2:
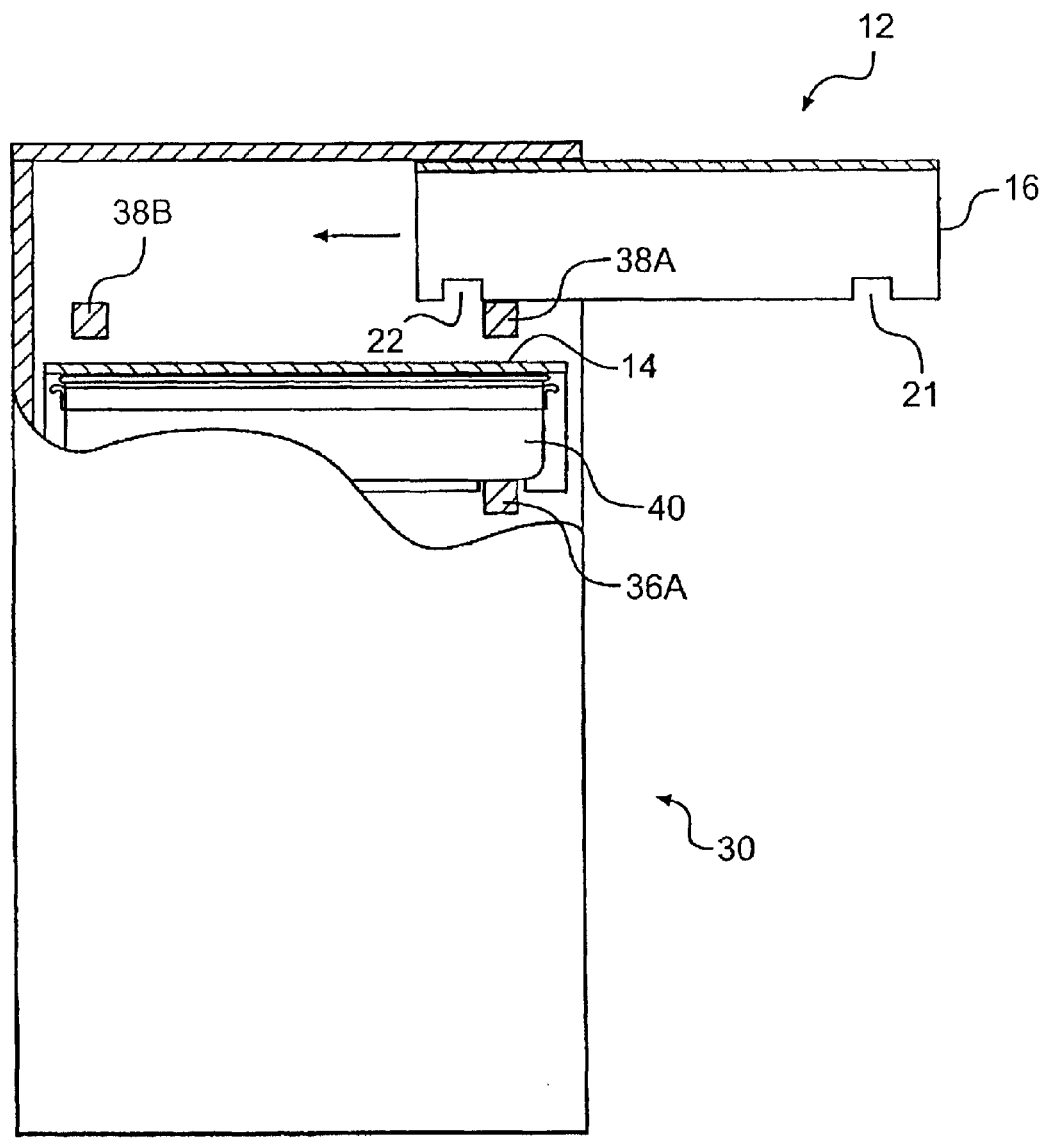
FIG. 2 is a partial cutaway view of a closure lid being moved into the shelf unit for engagement with the shelf and a view of a container mounted on a second shelf with the closure lid mounted on the upper portion of the container.
Figure 3:
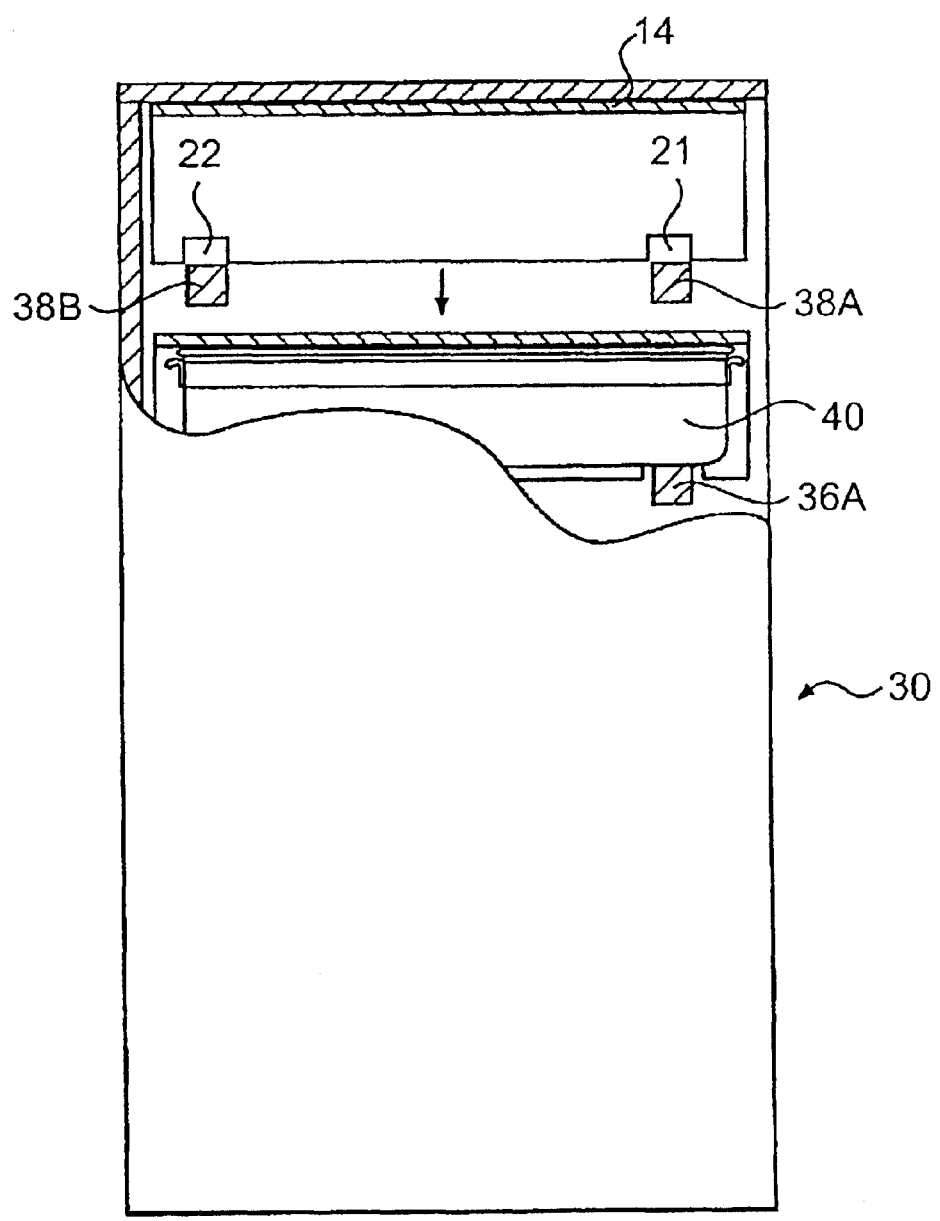
FIG. 3 is a partial cutaway view of the closure lid being mounted on the shelf with the notches formed in the closure lid being aligned to mate with the shelf.

FIGS. 1–3 illustrate the positioning of the closure 12 within the opening 30 to align the closure 12 with the shelf supports 38A, 38B. First, as illustrated in FIGS. 1 and 2, the closure 12 is disposed adjacent to the shelf supports 38A, 38B and is arranged to be slid into the opening 30. Second, as illustrated in FIG. 3, the closure 12 is aligned with the shelf supports 38A, 38B with the notches 21, 22 aligned to rest on the shelf supports 38A, 38B during non-use of the closure 12.

Figure 4:
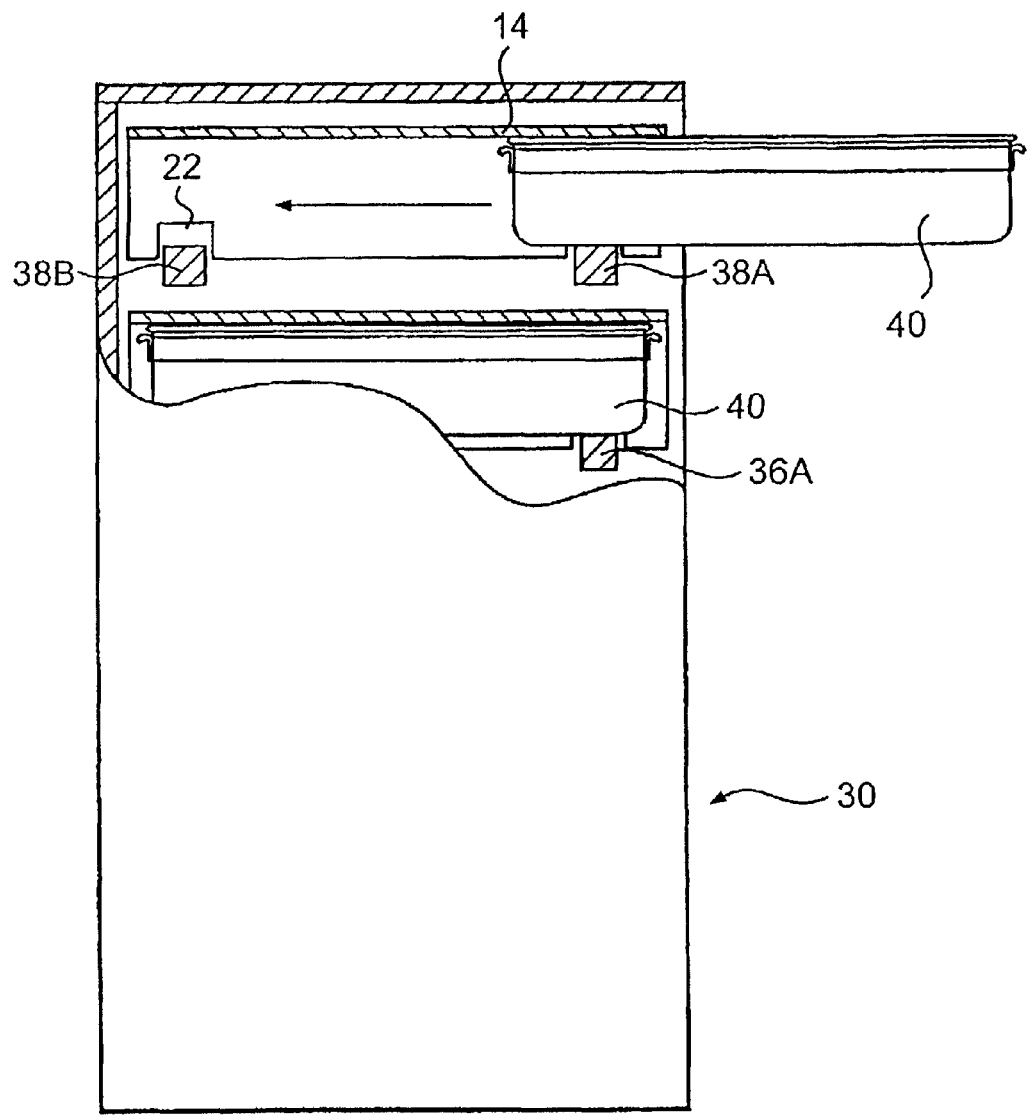
FIG. 4 is a partial cutaway view of a container being moved into the shelf unit wherein the closure lid is slightly moved upwardly for permitting the container to enter into the shelf unit.
Figure 5:
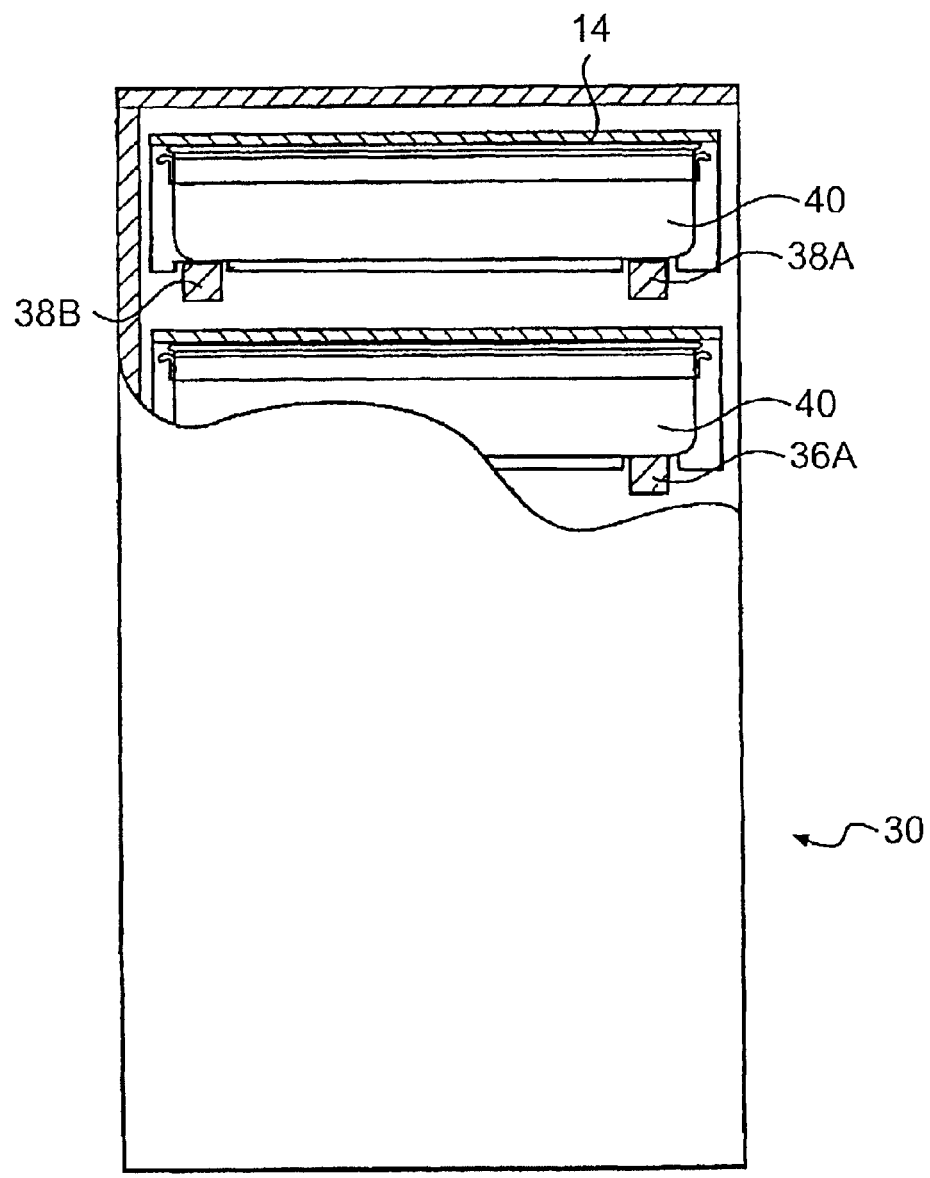
FIG. 5 is a partial cutaway view of a container being positioned within the shelf unit with the closure lid engaging the top of the container for forming a closure thereto.

FIGS. 4 and 5 illustrate the positioning of the container 40 within the opening 30 to align the container 40 with the shelf supports 38A, 38B. As illustrated in FIGS. 4 and 5, the container 40 is disposed adjacent to the shelf supports 38A, 38B and is arranged to be slid into the opening 30. The container 40 slightly raises the closure 12 as the container is slid onto the shelf supports 38A, 38B. The notches 21, 22 are raised off of the shelf supports 38A, 38B during use of the closure 12 relative to the container 40. As the container 40 is disposed on the shelf supports 38A, 38B, by gravity the closure 12 is disposed directly on top of the opening in the container 40 to provide a tight closure for the container 40. As illustrated in FIGS. 2–5, after a container 40 is inserted into the cabinet 10 and is positioned on the shelf supports, the notches formed in either of the sidewalls will extend downwardly a slight extend to be capable of being engaged with the self supports for preventing dislodgement of the closure 12 from within the cabinet 10 during insertion and removal of the container 40 from the shelf supports.

The first sidewall 16 extends downwardly a predetermined dimension wherein the notches 21, 22 permits the first sidewall 16 to be raised and lowered very slightly relative to the shelf supports 38A, 38B. The notches 21, 22 serve to retain the closure 12 within the opening 30 so that the closure 12 is not accidentally dislodged from the cabinet 10 during non-use. The second sidewall 18 extends downwardly a predetermined dimension that is less that the downward extension of the first sidewall 16. In this way, the second sidewall 18 can be positioned on the shelf supports 38A, 38B during non-use and will be raised slightly upwardly when a container 40 is slid onto the shelf supports 38A, 38B.

In another embodiment, the first sidewall 16 and the second sidewall 18 may be formed to extend downwardly substantially the same predetermined dimension. This will permit the first sidewall 16 and the second sidewall 18 to be raised and lowered very slightly relative to the shelf supports 38A, 38B. The weight of the closure 12 will retain the closure relative to the shelf supports 38A, 38B and within the opening 30 so that the closure 12 is not accidentally dislodged from the cabinet 10 during non-use. During use, the closure 12 will be raised slightly upwardly when a container 40 is slid onto the shelf supports 38A, 38B to permit the closure 12 to cover the container 40.

The closure 12 is mounted within the cabinet 30 to freely move up and down very slightly, approximately ⅛ to ¼ of an inch 3 mm to 6 mm. When the container 40 is positioned on shelf supports 38A, 38B, the closure 12 is slightly lifted to permit the closure 12 to then be disposed on the container 40 with the force of gravity holding the closure 12 in a tight fit with the container 40. When no container 40 is resting on the shelf supports 38A, 38B, the notches 21, 22 of the closure 12 engage with the shelf supports 38A, 38B to hold the closure 12 relative thereto. The closure 12 may be anchored to the shelf supports 38A, 38B to permit the container 40 to be used as a drawer so that the container 40 may be partially slid out relative to the cabinet 30 to permit access to the container 40 without the container 40 falling from the shelf supports 38A, 38B.

Figure 6:
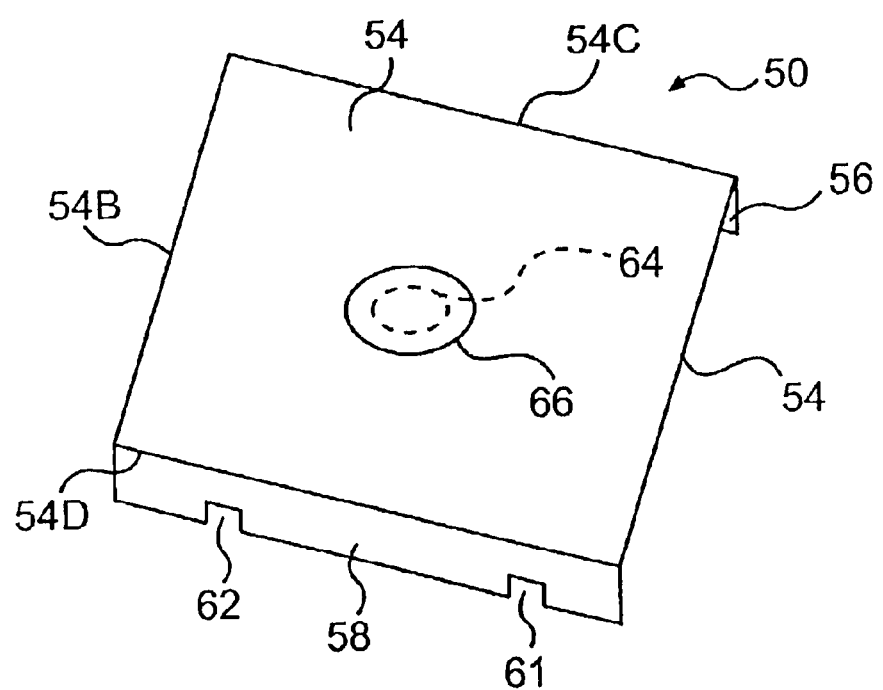
FIG. 6 is a perspective view of a lid with an adjustable vent being disposed on the top thereof.

As illustrated in FIG. 6, a closure 50 includes a first surface 54 having a front end 54A, a rear end 54B, a first side 54C and a second side 54D. A first sidewall 56 extends downwardly a predetermined distance from said first side 54C of said first surface 54. A second sidewall 58 extends downwardly a predetermined distance from said second side 54D of said first surface 54. At least one notch, 61, 62, is formed in said second sidewall 58 for engaging a shelf support disposed within a cabinet for selectively mounting the closure 50 on the shelf supports during non-use of a container and for closing an opening in a top of a container when the container is positioned on the shelf supports.

The closure 50 includes an opening 64 in the first surface 54 for regulating the amount of air and moisture that an operator desires for the food product disposed within a container mounted beneath the closure 50. An adjustable vent 66 is mounted relative to the opening 64 to permit the desired regulation.

Figure 7:
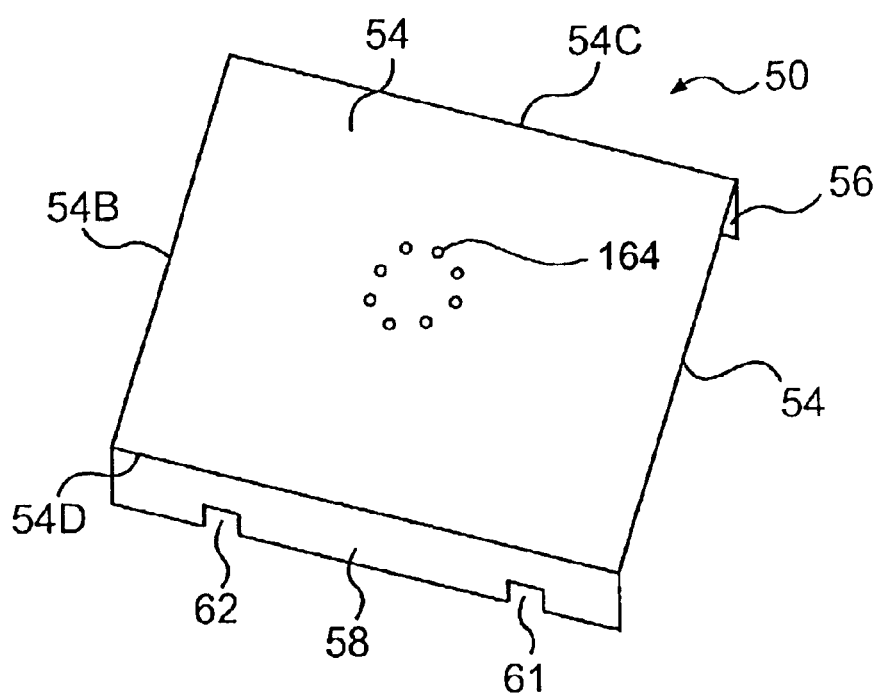
FIG. 7 is a perspective view of a lid with a vent being disposed on the top thereof.

As illustrated in FIG. 7, another embodiment of a closure 50 is set forth that includes a first surface 54 having a front end 54A, a rear end 54B, a first side 54C and a second side 54D. A first sidewall 56 extends downwardly a predetermined distance from said first side 54C of said first surface 54. A second sidewall 58 extends downwardly a predetermined distance from said second side 54D of said first surface 54. At least one notch, 61, 62, is formed in said second sidewall 58 for engaging a shelf support disposed within a cabinet for selectively mounting the closure 50 on the shelf supports during non-use of a container and for closing an opening in a top of a container when the container is positioned on the shelf supports.

As shown in FIG. 7, the closure 50 may include a plurality of openings 164 in the first surface 54 for venting the food product disposed within a container mounted beneath the closure 50.

Figure 8:
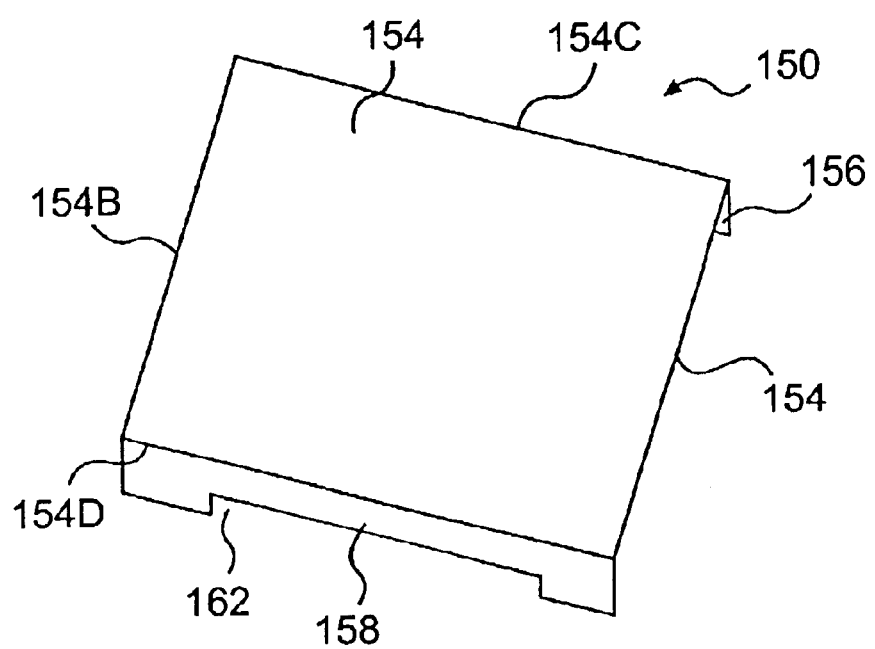
FIG. 8 is a perspective view of a lid with a single notch formed in a sidewall.

As illustrated in FIG. 8, another embodiment of a closure 150 is set forth that includes a first surface 154 having a front end 154A, a rear end 154B, a first side 154C and a second side 154D. A first sidewall 156 extends downwardly a predetermined distance from said first side 154C of said first surface 154. A second sidewall 158 extends downwardly a predetermined distance from said second side 154D of said first surface 154. A notch 162 may be formed in said second sidewall 158 for engaging a shelf support disposed within a cabinet for selectively mounting the closure 150 on the shelf supports during non-use of a container and for closing an opening in a top of a container when the container is positioned on the shelf supports. The single notch 162 includes a projection adjacent to the front end 154A and a projection adjacent to the rear end 154B for ensuring that the closure 150 is retained relative to the cabinet and the self supports when a container 40 is inserted into the cabinet or removed from the cabinet.

Figure 9:
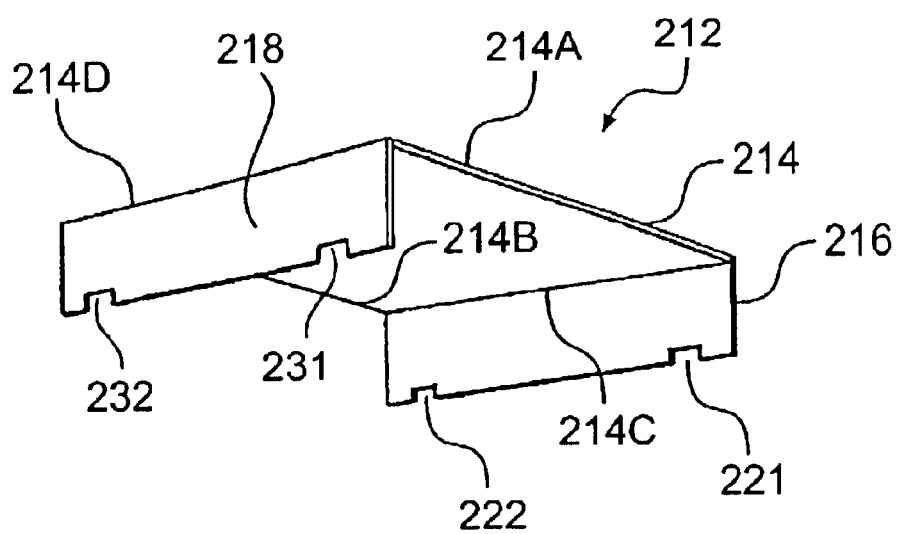
FIG. 9 is a lower perspective view of a lid with a plurality of notches being formed in the sidewalls.

As illustrated in FIG. 9, another embodiment of a closure 212 is set forth that includes a first surface 214 having a front end 214A, a rear end 214B, a first side 214C and a second side 214D. A first sidewall 216 extends downwardly a predetermined distance from said first side 214C of said first surface 214. A second sidewall 218 extends downwardly a predetermined distance from said second side 214D of said first surface 214. A plurality of notches 221, 222, 231 and 232 may be formed in said first sidewall 216 and the second sidewall 218 for engaging a shelf support disposed within a cabinet for selectively mounting the closure 212 on the shelf supports during non-use of a container and for closing an opening in a top of a container when the container is positioned on the shelf supports. The four notches 221, 221, 231 and 232 ensure that the closure 212 is retained relative to the cabinet and the self supports when a container 40 is inserted into the cabinet or removed from the cabinet.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A closure for a container comprising:
    a first surface including a front end, a rear end, a first side and a second side;
    a first sidewall extending a predetermined distance from said first side of said first surface;
    a second sidewall extending a predetermined distance from said second side of said first surface; and
    at least one notch formed in said first sidewall adapted for engaging a shelf for selectively mounting said closure on the shelf during non-use of the container and for closing an opening in a top of the container when the container is positioned on the shelf;
    wherein said first surface is adapted to engage an upper surface of the container when the container is slid onto the shelf, slightly raising said first surface to disengage at least a portion of said at least one notch from the shelf and permit the first surface to form the closure for the container.

2. The closure for the container according to claim 1, wherein two notches are formed on said first sidewall that are adapted for engaging a shelf.

3. The closure for the container according to claim 1, wherein said closure is adapted to be the secured to the shelf to enable the container to be used as a drawer.

4. The closure for the container according to claim 1, and further including a vent disposed on said first surface for regulating the amount of air and moisture entering and exiting from the container.

5. The closure for the container according to claim 1, wherein said at least one notch is adapted to mount the closure on the shelf during non-use for preventing an accidental dislodging of the closure relative to the shelf.

6. The closure for the container according claim 1, wherein the closure has a predetermined weight, the weight of said closure is adapted to mount the closure on the container during use to form a tight seal for closing the top of the container.

7. The closure for the container according to claim 1, wherein the first sidewall extends downwardly a predetermined distance and the at least one notch is adapted to permit the first sidewall to be raised and lowered very slightly relative to the shelf, said at least one notch is adapted to retain the closure so that the closure is not accidentally dislodged from the shelf during non-use, the second sidewall extends downwardly a predetermined distance that is less that the downward extension of the first sidewall.

8. The closure for the container according to claim 7, wherein the first sidewall and the second sidewall adapted to be are positioned on the shelf during non-use and will be raised slightly upwardly when the container is slid onto the shelf for closing the opening in the top of the container.

9. The closure for the container according to claim 1, wherein four notches are formed on said closure, two notches being formed on the first sidewall and two notches being formed on the second sidewall for positioning the closure on the shelf during non-use and for enabling said closure to be raised slightly upwardly when the container is slid onto the shelf for closing the opening in the top of the container.

10. A housing for periodically storing a container comprising:
    a cabinet having an opening for defining a space therein;
    a shelf support being operatively positioned within said space formed in said cabinet;
    the closure for a container comprising;
        a first surface including a front end, a rear end, a first side and a second side;
        a first sidewall extending a predetermined distance from said first side of said first surface;
        a second sidewall extending a predetermined distance from said second side of said first surface; and
        at least one notch formed in said first sidewall adapted for engaging said shelf support for selectively mounting said closure on said shelf support during non-use of the container and for closing an opening in a top of the container when the container is positioned on said shelf support;
        wherein said first surface is adapted to engage an upper surface of the container when the container is slid onto the shelf support, slightly raising said first surface to disengage at least a portion of said at least one notch from the shelf support and permit the first surface to form the closure for the container.

11. The housing for periodically storing the container according to claim 10, wherein two notches are formed on said first sidewall that are adapted for engaging the shelf support.

12. The housing for periodically storing the container according to claim 10, wherein said closure is secured to the shelf support to enables the container to be used as a drawer.

13. The housing for periodically storing the container according to claim 14 and further including a vent disposed on said first surface for regulating the amount of air and moisture entering and exiting from the container.

14. The housing for periodically storing the container according to claim 10, wherein said at least one notch mounts the closure on the shelf support during non-use for preventing an accidental dislodging of the closure relative to the shelf support.

15. The housing for periodically storing the container according to claim 10, wherein the closure has a predetermined weight, the weight of said closure mounts the closure on the container during use to form a tight seal for closing the top of the container.

16. The housing for periodically storing the container according to claim 10 wherein the first sidewall extends downwardly a predetermined distance and the at least one notch permits the first sidewall to be raised and lowered very slightly relative to the shelf support, said at least one notch retains the closure so that the closure is not accidentally dislodged from the shelf support during non-use, the second sidewall extends downwardly a predetermined distance that is less that the downward extension of the first sidewall.

17. The housing for periodically storing the container according to claim 16, the wherein the first sidewall and the second sidewall are positioned on the shelf support during non-use and will be raised slightly upwardly when the container is slid onto the shelf support for closing the opening in the top of the container.

18. A closure for a container comprising:
  a first surface including a front end, a rear end, a first side and a second side;
  a first sidewall extending a predetermined distance from said first side of said first surface;
  a second sidewall extending a predetermined distance from said second side of said first surface, said predetermined distance of said first sidewall being substantially equal to the predetermined distance of the second sidewall;
  said first sidewall and said second sidewall being in engagement with a shelf for selectively mounting said closure on the shelf during non-use of the container and for being disengaged from the shelf for closing an opening in a top of the container when the container is positioned on the shelf;
  wherein said first surface is adapted to engage an upper surface of the container when the container is slid onto the shelf slighty raising said first surface to disengage the first sidewall and the second side wall from the shelf for permitting the first surface to form the closure for the container.

* * * * *